United States Patent
Hidaka et al.

(10) Patent No.: US 10,388,933 B2
(45) Date of Patent: Aug. 20, 2019

(54) ENERGY STORAGE APPARATUS

(71) Applicant: GS Yuasa International Ltd., Kyoto-shi (JP)

(72) Inventors: Tsuyoshi Hidaka, Kyoto (JP); Yasuyuki Iwashima, Kyoto (JP); Masanori Kogure, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 99 days.

(21) Appl. No.: 15/652,424

(22) Filed: Jul. 18, 2017

(65) Prior Publication Data

US 2018/0040872 A1 Feb. 8, 2018

(30) Foreign Application Priority Data

Aug. 8, 2016 (JP) .................................. 2016-155874
May 18, 2017 (JP) .................................. 2017-099073

(51) Int. Cl.
| | |
|---|---|
| *H01M 2/22* | (2006.01) |
| *H01M 2/30* | (2006.01) |
| *H01G 9/008* | (2006.01) |
| *H01G 9/08* | (2006.01) |
| *H01M 10/0525* | (2010.01) |

(Continued)

(52) U.S. Cl.
CPC .............. *H01M 2/22* (2013.01); *H01G 9/008* (2013.01); *H01G 9/08* (2013.01); *H01M 2/1077* (2013.01); *H01M 2/206* (2013.01); *H01M 2/30* (2013.01); *H01M 2/305* (2013.01); *H01M 10/0525* (2013.01)

(58) Field of Classification Search
CPC ...... H01M 2/22; H01M 2/305; H01M 2/1077; H01M 2/206; H01M 10/0525; H01M 2/30; H01G 9/008; H01G 9/08
See application file for complete search history.

(56) References Cited

U.S. PATENT DOCUMENTS

| | | | |
|---|---|---|---|
| 2010/0055994 A1* | 3/2010 | Mizutani | H01M 2/206 439/764 |
| 2013/0071728 A1* | 3/2013 | Shibanuma | H01M 2/0404 429/179 |
| 2013/0323574 A1 | 12/2013 | Tsunaki et al. | |

(Continued)

FOREIGN PATENT DOCUMENTS

| | | |
|---|---|---|
| EP | 3 010 072 A1 | 4/2016 |
| JP | 2003-346778 A | 12/2003 |

(Continued)

OTHER PUBLICATIONS

Extended European Search Report dated Sep. 21, 2017 in European Application No. 17185336.9.

*Primary Examiner* — Stewart A Fraser
(74) *Attorney, Agent, or Firm* — McGinn I.P. Law Group, PLLC.

(57) ABSTRACT

An energy storage apparatus includes: energy storage devices each of which has a container and an electrode terminal; a connecting member which is connected to the electrode terminal of one of the energy storage devices and is connected to an external conductive member; and a restricting portion which is in contact with the container, which said one energy storage device includes, and is in contact with the connecting member to restrict the connecting member from moving by an external force.

20 Claims, 7 Drawing Sheets

(51) Int. Cl.
   *H01M 2/10*     (2006.01)
   *H01M 2/20*     (2006.01)

(56) References Cited

U.S. PATENT DOCUMENTS

2014/0030586 A1    1/2014   Tononishi et al.
2016/0372736 A1*  12/2016   Kim .................... B60L 11/1879

FOREIGN PATENT DOCUMENTS

| JP | 2011-023142 A | 2/2011 |
| JP | 2011-165628 A | 8/2011 |
| JP | 2013-246966 A | 12/2013 |
| JP | 2014-026948 A | 2/2014 |
| JP | 2015-088267 A | 5/2015 |

* cited by examiner

III-III CROSS SECTION

ENERGY STORAGE APPARATUS

CROSS-REFERENCE TO RELATED APPLICATIONS

This application is based on Japanese Patent Applications No. 2016-155874 filed on Aug. 8, 2016, and No. 2017-099073 filed on May 18, 2017, the entire contents of which are hereby incorporated by reference.

FIELD

The present invention relates to an energy storage apparatus which includes energy storage devices each of which has an electrode terminal, and a connecting member connected to the electrode terminal and also connected to an external conductive member.

BACKGROUND

Conventionally, there has been known an energy storage apparatus which includes energy storage devices each of which has an electrode terminal, and a connecting member connected to the electrode terminal and also connected to an external conductive member (see JP 2015-088267 A, for example). In this energy storage apparatus, the electrode terminals of the energy storage devices are connected to each other using bus bars, and an external terminal (connecting member) is connected to the electrode terminal of the energy storage device disposed at an end of the plurality of energy storage devices.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the above-mentioned conventional energy storage apparatus, when an external force is applied to the connecting member, the electrode terminal of the energy storage device may be damaged. Because the connecting member is mounted on the electrode terminal of the energy storage device, there is a possibility that when an external force is applied to the connecting member, the force is applied to the electrode terminal of the energy storage device so that the electrode terminal is damaged. Further, when the electrode terminal of the energy storage device is damaged, there is a possibility that a defect such as leakage of a gas from a container of the energy storage device may occur.

An object of the present invention is to provide an energy storage apparatus which can suppress the occurrence of damage of the electrode terminal of the energy storage device.

According to an aspect of the present invention, there is provided an energy storage apparatus which includes: energy storage devices each of which has a container and an electrode terminal; a connecting member which is connected to the electrode terminal of one energy storage device of the energy storage devices and is connected to an external conductive member; and a restricting portion which is in contact with the container, which the one energy storage device includes, and is in contact with the connecting member to restrict the connecting member from moving by an external force.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
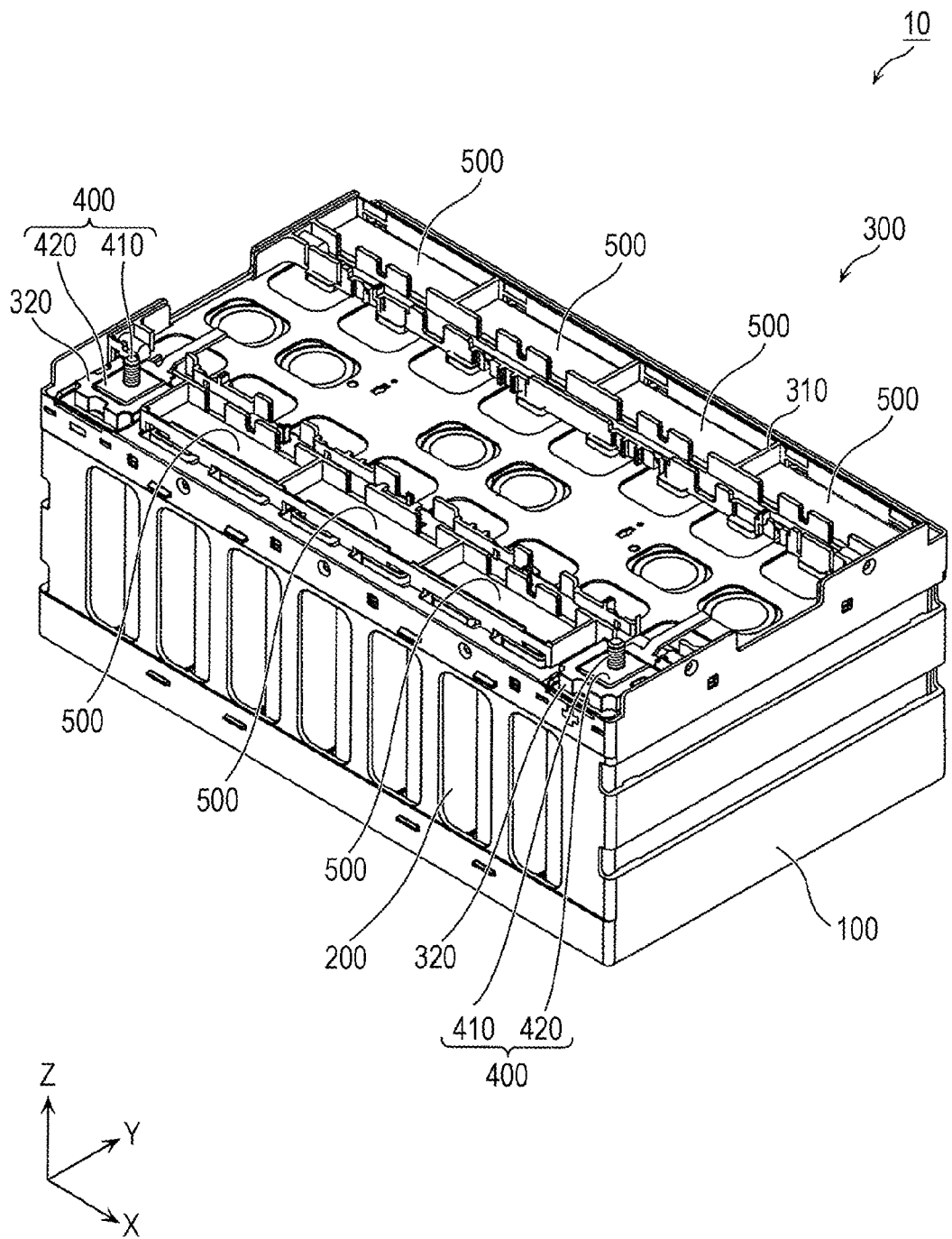
FIG. 1 is a perspective view showing an external appearance of an energy storage apparatus according to an embodiment of the present invention.

According to an aspect of the present invention, there is provided an energy storage apparatus which includes: energy storage devices each of which has a container and an electrode terminal; a connecting member which is connected to the electrode terminal of one of the energy storage devices and is connected to an external conductive member; and a restricting portion which is in contact with the container, which said one energy storage device includes, and is in contact with the connecting member to restrict the connecting member from moving by an external force.

With such a configuration, the energy storage apparatus includes the restricting portion which is in contact with the container of the energy storage device and the connecting member thus restricting movement of the connecting member caused by an external force. In the configuration where the connecting member is directly connected to the electrode terminal of the energy storage device, when the connecting member intends to move by an external force, a force that the connecting member intends to move is directly applied to the electrode terminal and hence, an excessively large force is applied to the electrode terminal thus giving rise to a possibility that the electrode terminal is damaged. According to the present invention, the restricting portion is in contact with the container thus restricting the movement of the connecting member and hence, a force that the connecting member intends to move can be applied to the container so that it is possible to suppress the occurrence of damage on the electrode terminal of the energy storage device.

The connecting member may include a bolt portion having a threaded portion and a head portion, the restricting portion may have an opening portion which accommodates at least a part of the head portion, and the opening portion may be in contact with the head portion to restrict the connecting member from rotating about an axis of the threaded portion.

With such a configuration, the opening portion formed on the restricting portion is in contact with the head portion of the bolt portion of the connecting member thus restricting the rotation of the connecting member about the axis of the threaded portion of the bolt portion. In the case where the connecting member includes the bolt portion, fastening of the bolt is performed at the time of connecting the external conductive member to the connecting member. At this stage, the connecting member intends to rotate about the axis of the threaded portion of the bolt portion. By bringing the head portion of the bolt portion into contact with the opening portion of the restricting portion, the rotation of the connecting member can be restricted. The movement of the connecting member caused by an external force can be restricted as described above and hence, it is possible to suppress the occurrence of damage on the electrode terminal of the energy storage device.

The connecting member may further include a body portion having a first surface which is in surface contact with the electrode terminal, which the one energy storage device includes, and a second surface which is in surface contact with the conductive member, and the body portion may be formed separately from the bolt portion.

With such a configuration, the body portion which makes the electrode terminal of the energy storage device and the external conductive member conductive to each other is formed separately from the bolt portion and hence, in the fastening of the bolt at the time of connecting the external conductive member to the connecting member, it is possible to suppress the applying torque to the body portion at the time of fastening the bolt.

The restricting portion may include: a metal member fixed to the container which the one energy storage device includes; and an insulating member which is disposed between the metal member and the connecting member and is in contact with the connecting member to restrict the connecting member from moving.

With such a configuration, the restricting portion includes: the metal member which is fixed to the container of the energy storage device; and the insulating member which is in contact with the connecting member between the metal member and the connecting member thus restricting the movement of the connecting member. Even when the restricting portion is fixed to the container by the metal member, the movement of the connecting member can be restricted while ensuring the insulation between the container, the metal member and the connecting member by the insulating member.

At least one of the metal member and the connecting member may be integrally formed with the insulating member.

With such a configuration, at least one of the metal member and the connecting member is integrally formed (integral forming) with the insulating member by insert molding and hence, the number of parts can be reduced. Thus, the manufacture of the energy storage apparatus can be simplified.

The electrode terminals of the energy storage devices may be welded terminals which are weldable with bus bars.

With such a configuration, by forming the electrode terminals of the energy storage devices using the welded terminals, the electrode terminals, other than the electrode terminals connected to the connecting member, and the bus bars can be connected to each other by welding. Thus, the number of parts can be reduced, and the electrode terminals and the bus bars can be firmly fixed to each other.

The energy storage apparatus may further include a cover member which is disposed in a straddling manner over the energy storage devices, and at least a part of the restricting portion may be integrally formed with the cover member.

With such a configuration, at least a part of the restricting portion is integrally formed with the cover member disposed in a straddling manner over the energy storage devices and hence, the number of parts can be reduced. Thus, the manufacture of the energy storage apparatus can be simplified.

The restricting portion may have higher rigidity than the cover member.

With such a configuration, by increasing rigidity of the restricting portion, the movement of the connecting member can be firmly restricted.

The present invention can be realized not only as the above-mentioned energy storage apparatus but also as the restricting portion which the energy storage apparatus includes.

According to the above-mentioned energy storage apparatus, it is possible to suppress the occurrence of damage on the electrode terminal of the energy storage device.

Hereinafter, an energy storage apparatus according to an embodiment of the present invention is described with reference to drawings. The embodiment described hereinafter is one preferred specific example of the present invention. In the embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

In the following description and drawings, an arrangement direction of the energy storage devices, an arrangement direction of the external terminals, a direction that long-side surfaces of the container of the energy storage device face each other or a thickness direction of the container is defined as an X axis direction. An arrangement direction of the electrode terminals in one energy storage device or a direction that short-side surfaces of the container face each other is defined as a Y axis direction. A vertical direction of the energy storage device (a direction that gravity acts on the energy storage device in an installed state) is defined as a Z axis direction. These X axis direction, Y axis direction and Z axis direction are directions intersecting with each other (orthogonal to each other in this embodiment). There may be also a case where the Z axis direction is not the vertical direction depending on a mode of use. For the sake of convenience of description, the description is made using the Z axis direction as the vertical direction.

Embodiment

First, a configuration of an energy storage apparatus 10 is described.

Figure 2:
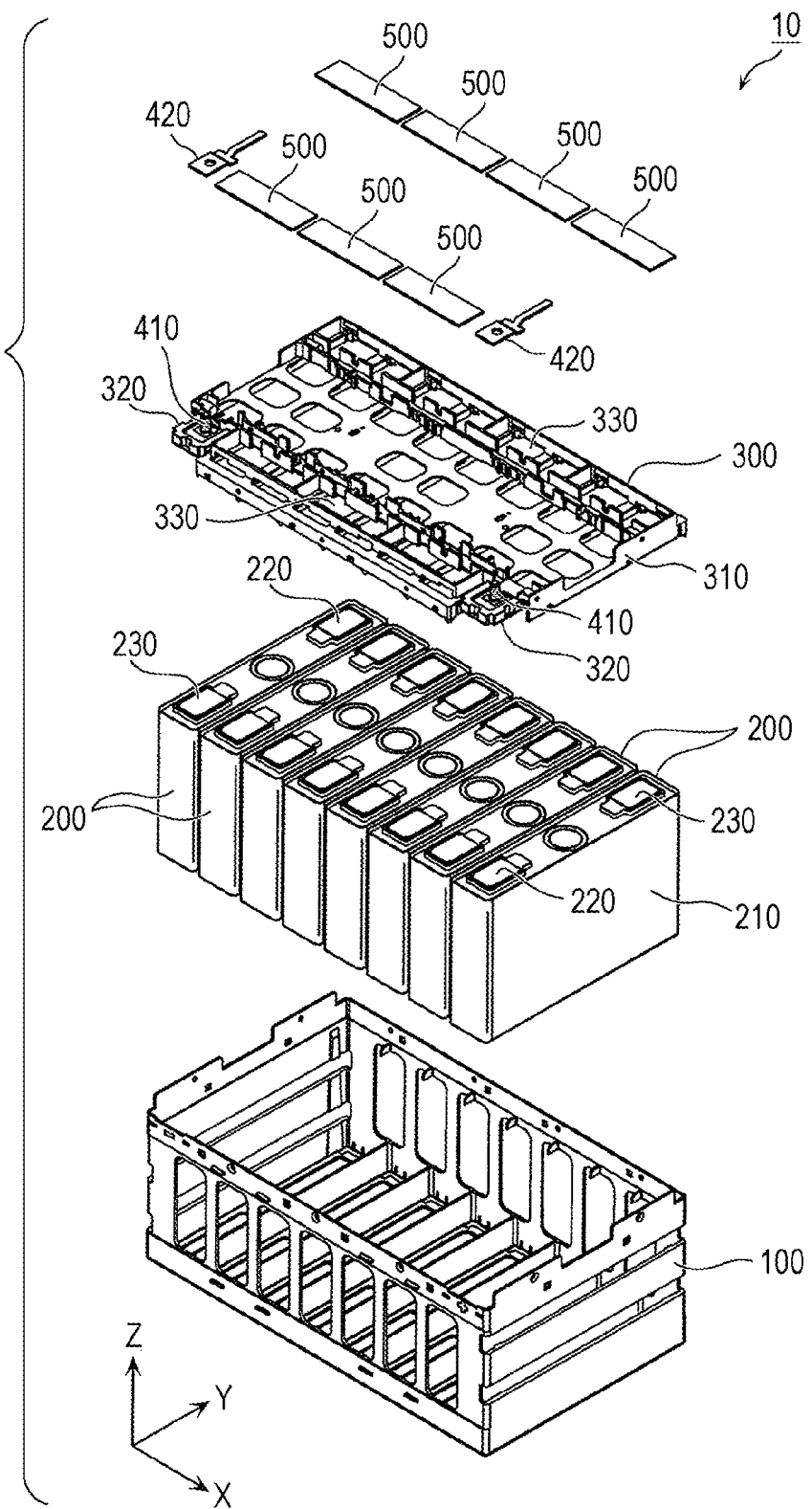
FIG. 2 is an exploded perspective view showing respective constitutional elements when the energy storage apparatus is disassembled.

FIG. 1 is a perspective view showing an external appearance of an energy storage apparatus 10 according to an embodiment. FIG. 2 is an exploded perspective view showing respective constitutional elements when the energy storage apparatus 10 is disassembled. In these drawings, for the sake of convenience of description, a lid body of an outer case 100 is omitted.

The energy storage apparatus 10 is an apparatus which can be charged with electricity therein from the outside of the energy storage apparatus 10 or can discharge electricity to the outside of the energy storage apparatus 10. For example, the energy storage apparatus 10 is a battery module used for power source for an automobile such as an electric vehicle (EV), a hybrid electric vehicle (HEV), or a plug-in hybrid electric vehicle (PHEV), a power source for power storage and the like. As shown in FIG. 1 and FIG. 2, the energy storage apparatus 10 includes the outer case 100, energy storage devices 200 housed in the outer case 100, a cover member 300, external terminals 400, bus bars 500 and the like.

The outer case 100 is a container (module case) having a rectangular shape (box shape) which forms an outer case of the energy storage apparatus 10. The outer case 100 is disposed outward the energy storage devices 200, the cover member 300 and the like and allows the energy storage devices 200 and the like to be disposed at predetermined positions in the outer case 100 thus protecting the energy storage devices 200 and the like from an impact or the like. For example, the outer case 100 is made of an insulating resin material such as polycarbonate (PC), polypropylene (PP), polyethylene (PE), a polyphenylene sulfide resin (PPS), polybutylene terephthalate (PBT) or an ABS resin. With such a configuration, the outer case 100 prevents the energy storage devices 200 and the like from coming into contact with a metal member or the like disposed outside the outer case 100.

The outer case 100 includes a plurality of partitions therein, and the energy storage devices 200 are housed in the outer case 100 in a state where each energy storage device 200 is inserted between each two partitions out of the plurality of partitions. In a wall portion of the outer case 100, a plurality of openings through which heat from the energy storage devices 200 is relieved are formed. Although the outer case 100 also has the lid body (not shown in the drawing) having a flat rectangular shape, the description of the lid body is omitted. Further, in the outer case 100, electric equipment such as a printed circuit board and a relay may also be disposed.

The energy storage device 200 is a secondary battery (battery cell) which can be charged with electricity or discharge electricity. To be more specific, the energy storage device 200 is a nonaqueous electrolyte secondary battery such as a lithium ion secondary battery. The energy storage device 200 has a flat prismatic shape and, in this embodiment, eight energy storage devices 200 are housed in the outer case 100 in a state where the eight energy storage devices 200 are arranged in a row in the X axis direction. The energy storage device 200 is not limited to a nonaqueous electrolyte secondary battery, and may be a secondary battery other than a nonaqueous electrolyte secondary battery, or may be a capacitor and, further, may be a primary battery which can use stored electricity even when the battery is not charged by a user. Further, also the number of energy storage devices 200 housed in the outer case 100 is not limited.

Each energy storage device 200 includes a container 210, a positive electrode terminal 220, and a negative electrode terminal 230. An electrode assembly (also referred to as an energy storage element or a power generating element), a positive electrode current collector, a negative electrode current collector and the like are disposed in the container 210, and an electrolyte solution (nonaqueous electrolyte) is sealed in the container 210. Illustrations of these components are omitted, and the detailed description of such components is also omitted.

The container 210 is a rectangular parallelepiped (prismatic-shaped) case having a lid portion on an upper side (a plus side in the Z axis direction). Although a material for forming the container 210 is not particularly limited, it is preferable that the container 210 be made of weldable metal such as stainless steel, aluminum or an aluminum alloy, for example.

The positive electrode terminal 220 is a positive-electrode-side electrode terminal of the energy storage device 200, the negative electrode terminal 230 is a negative-electrode-side electrode terminal of the energy storage device 200, and both the positive electrode terminal 220 and the negative electrode terminal 230 are mounted on the lid portion of the container 210. The positive electrode terminal 220 and the negative electrode terminal 230 are metal-made electrode terminals through which electricity stored in the electrode assembly is discharged to a space outside the energy storage device 200, and through which electricity is introduced into a space inside the energy storage device 200 for storing electricity in the electrode assembly. In this embodiment, the energy storage devices 200 are disposed in a state where the positive electrode terminals 220 and the negative electrode terminals 230 are directed upward.

In this embodiment, the electrode terminals of the energy storage device 200 are welded terminals which are weldable with the bus bars 500. The positive electrode terminal 220 and the negative electrode terminal 230 of the energy storage device 200 are connected (joined) to the bus bars 500 by welding such as laser welding, resistance welding, or ultrasonic welding. With such a configuration, the positive electrode terminal 220 or the negative electrode terminal 230 of the energy storage device 200 is electrically connected to the positive electrode terminal 220 or the negative electrode terminal 230 of another energy storage device 200 through the bus bar 500. The positive electrode terminal 220 of the energy storage device 200 disposed on a positive-electrode-side external terminal 400 side (a plus side in the X axis direction in FIG. 2) out of the plurality of energy storage devices 200 which the energy storage apparatus 10 includes is connected to the positive-electrode-side external terminal 400. Similarly, the negative electrode terminal 230 of the energy storage device 200 disposed on a negative-electrode-side external terminal 400 side (a minus side in the X axis direction in FIG. 2) out of the plurality of energy storage devices 200 is connected to the negative-electrode-side external terminal 400.

The cover member 300 is a member which is disposed above (a plus side in the Z axis direction) the plurality of energy storage devices 200 so as to straddle over the plurality of energy storage devices 200 thus being positioned with respect to the plurality of energy storage devices 200, and has a flat plate shape as a whole. The cover member 300 can hold the bus bars 500, the external terminals 400, electric equipment such as a relay, wirings (not shown in the drawing) and the like thus restricting positions of the bus bars 500 and the like, and can provide insulation between the bus bars 500 and other members.

The cover member 300 functions as a bus bar frame for positioning the bus bars 500 and the external terminals 400 with respect to the electrode terminals of the energy storage devices 200 and also as an electric part tray for holding electric equipment. The cover member 300 is made of an insulating resin material such as PC, PP, PE, PPS, PBT or an ABS resin, for example. The cover member 300 may be made of any material having insulating property.

The cover member 300 includes a cover member body portion 310 and restricting portions 320 as integral portions thereof. The cover member body portion 310 is a portion for holding the above-mentioned bus bars 500 and electric equipment, and a plurality of opening portions 330 are formed at portions corresponding to arrangement positions of the bus bars 500. The bus bars 500 are disposed at the opening portions 330 respectively, and the bus bars 500 and the electrode terminals of the energy storage devices 200 are respectively connected to each other. The restricting portion 320 is a portion for holding the external terminal 400, and restricts movement of the external terminal 400 caused by an external force by being brought into contact with the container 210 of the energy storage device 200 and the external terminal 400 (restricts an external force applied to the external terminal 400). The detailed configuration of the restricting portion 320 is described later.

The external terminal 400 is a conductive member which is connected to the electrode terminal of the energy storage device 200 and also connected to the external conductive member (a conductive member 600 in FIG. 5) of the energy storage apparatus 10, and is made of metal or the like capable of charging electricity from the outside of the energy storage apparatus 10 and discharging electricity to the outside of the energy storage apparatus 10. To be more specific, the positive-electrode-side external terminal 400 is disposed at an end portion (corner portion) of the cover member 300 on a plus side in the X axis direction and on a minus side in the Y axis direction, and the negative-electrode-side external terminal 400 is disposed at an end portion (corner portion) of the cover member 300 on a minus side in the X axis direction and on a minus side in the Y axis direction. The positive-electrode-side external terminal 400 is connected to the positive electrode terminal 220 of the energy storage device 200 disposed at an end portion of a unit formed of the plurality of energy storage devices 200 on a plus side in the X axis direction and also connected to the external conductive member. The negative-electrode-side external terminal 400 is connected to the negative electrode terminal 230 of the energy storage device 200 disposed at an end portion of the unit on a minus side in the X axis direction and also connected to the other external conductive member.

The external terminal 400 is a connecting member which is connected to the electrode terminal which one of the plurality of energy storage devices 200 (the predetermined energy storage device 200) includes and also connected to the external conductive member. In other words, the external terminal 400 is a fixing jig for fixing the external conductive member to the electrode terminal which the one energy storage device 200 includes. As described above, the external terminal 400 as the connecting member is disposed only on the energy storage device 200 which is one of the plurality of energy storage devices 200 (in this embodiment, the energy storage device 200 at the end portion), and such a connecting member is not disposed on the energy storage devices 200 other than the one energy storage device 200.

In this embodiment, the external terminal 400 is a bolt terminal having a bolt portion 410 and an external terminal body portion 420. The bolt portion 410 is a member for fixing the external conductive member to the external terminal 400, and the external terminal body portion 420 is a member for electrically connecting the electrode terminal of the energy storage device 200 and the conductive member to each other by bringing the electrode terminal and the conductive member into surface contact with each other. The external terminal body portion 420 which makes the electrode terminal and the conductive member conductive with each other is formed separately from the bolt portion 410 which fixes the conductive member to the external terminal 400. The detailed configurations of the bolt portion 410 and the external terminal body portion 420 are described later.

The bus bars 500 are plate-like conductive members made of metal or the like which are disposed above the electrode terminals of the plurality of energy storage devices 200 by being disposed inside the opening portions 330 of the cover member 300, and electrically connect the electrode terminals to each other. To be more specific, each bus bar 500 connects, in the energy storage devices 200 disposed adjacently to each other, the positive electrode terminal 220 or the negative electrode terminal 230 of one energy storage device 200 and the negative electrode terminal 230 or the positive electrode terminal 220 of the other energy storage device 200 to each other. In this embodiment, eight energy storage devices 200 are connected in series by seven bus bars 500. The bus bar 500 may be configured to connect several energy storage devices 200 in parallel.

The bus bars 500 are conductive members made of aluminum, for example. A material for forming the bas bars 500 is not particularly limited. All seven bus bars 500 may be made of the same material, or some bas bars 500 may be made of different materials.

Next, configurations of the restricting portion 320, and the bolt portion 410 and the external terminal body portion 420 of the external terminal 400 are described in detail. Hereinafter, although the configurations of the restricting portion 320 and the external terminal 400 on the positive electrode side (a plus side in the X axis direction) are described, the restricting portion 320 and the external terminal 400 on the negative electrode side (a minus side in the X axis direction) also have the same configurations.

Figure 3:
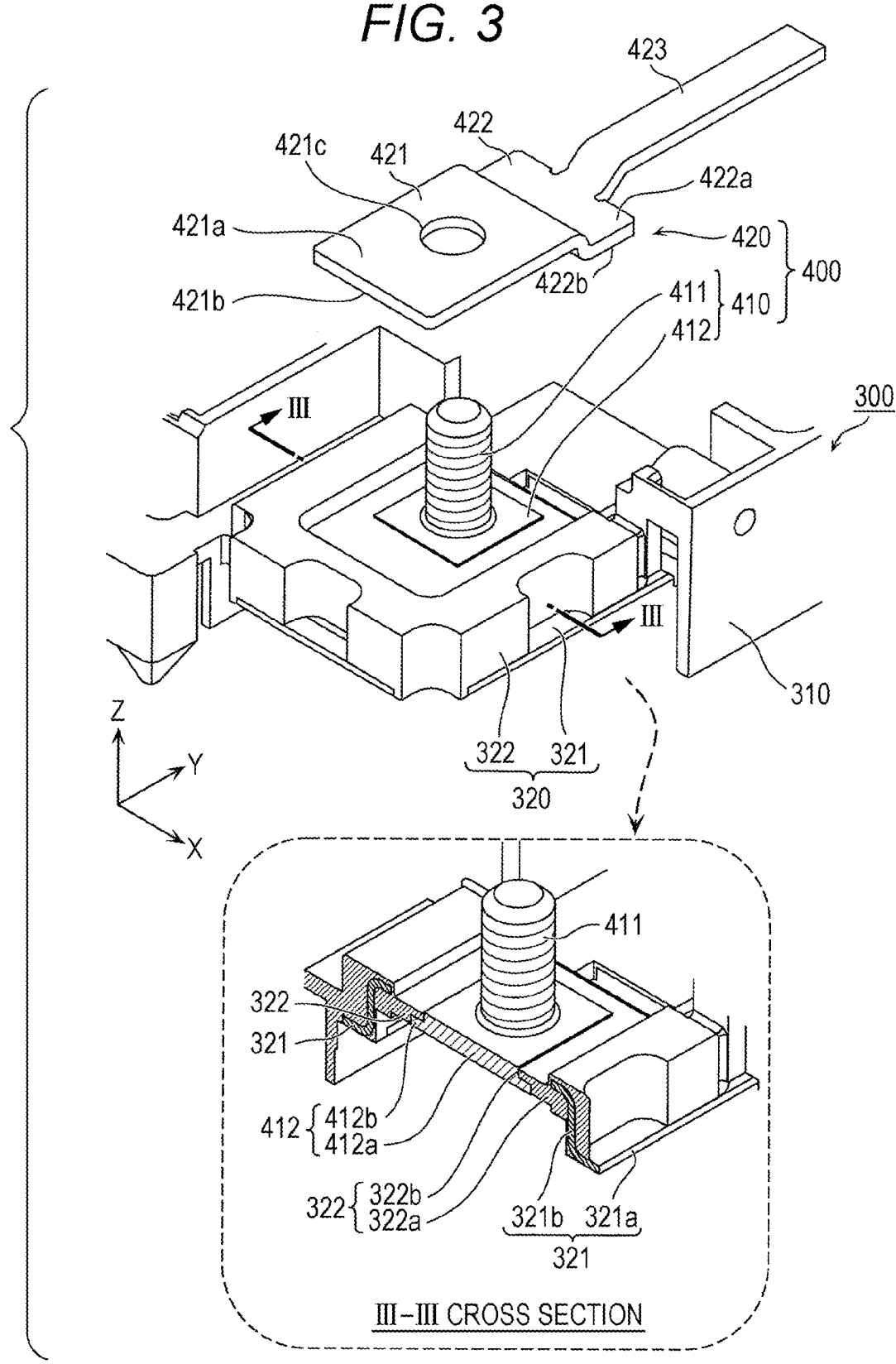
FIG. 3 is a perspective view and a cross-sectional view showing configurations of a restricting portion, and a bolt portion and an external terminal body portion of an external terminal according to the embodiment.
Figure 4:
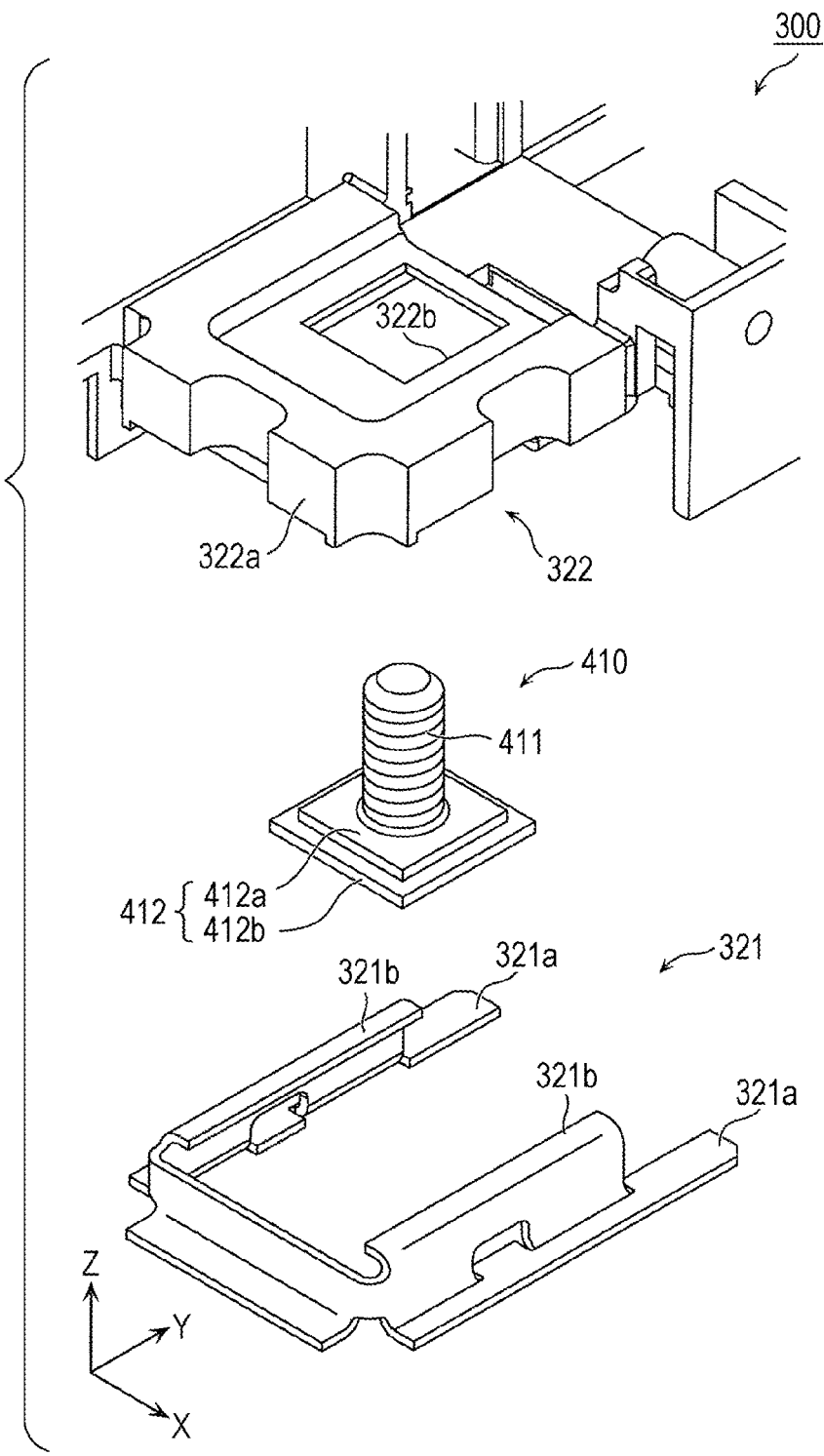
FIG. 4 is a perspective view showing respective constitutional elements when a metal member and an insulating member of the restricting portion and the bolt portion are separated from each other.
Figure 5:
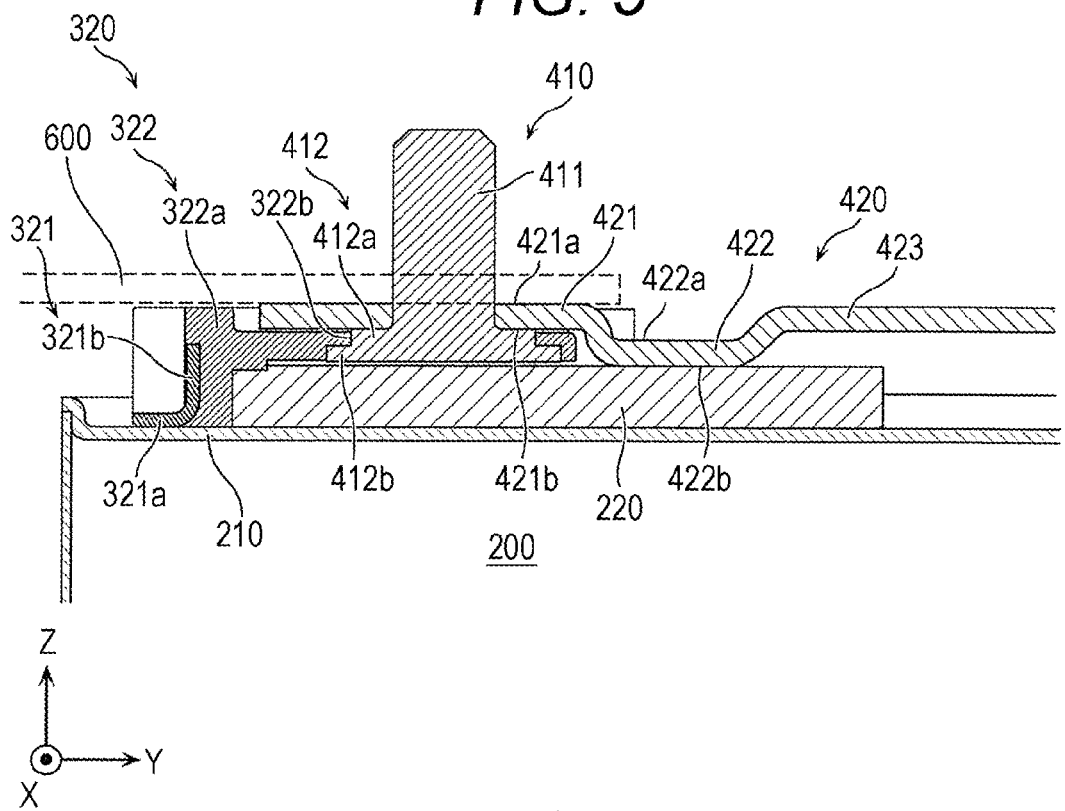
FIG. 5 is a cross-sectional view showing a positional relationship between the restricting portion, the bolt portion, the external terminal body portion, the energy storage device, and an external conductive member.

FIG. 3 is a perspective view and a cross-sectional view showing configurations of the restricting portion 320, and the bolt portion 410 and the external terminal body portion 420 of the external terminal 400 according to this embodiment. FIG. 4 is a perspective view showing respective constitutional elements when a metal member 321 and an insulating member 322 of the restricting portion 320 and the bolt portion 410 according to this embodiment are separated from each other. FIG. 5 is a cross-sectional view showing a positional relationship between the restricting portion 320, the bolt portion 410, the external terminal body portion 420, the energy storage device 200, and an external conductive member 600 according to this embodiment. FIG. 5 is a view showing a cross section of the energy storage apparatus 10 shown in FIG. 1 taken along a plane parallel to a YZ plane including a center axis of the bolt portion 410.

As shown in these drawings, the restricting portion 320 has the metal member 321 and the insulating member 322. The metal member 321 is a metal-made portion which is fixed to the container 210 which the one energy storage device 200 out of the plurality of energy storage devices 200 includes. The insulating member 322 is an insulating portion having at least a portion thereof disposed between the metal member 321 and the external terminal 400 and providing insulation between the metal member 321 and the external terminal 400. Although a material for forming the metal material 321 is not particularly limited, it is preferable that the metal material 321 be made of weldable metal such as stainless steel, aluminum, or an aluminum alloy, for example. Further, although a material for forming the insulating member 322 is also not particularly limited, as described above, the insulating member 322 is made of PC, PP, PE, PPS, PBT, an ABS resin or the like, for example. The metal member 321 has higher rigidity than the insulating member 322. In the cover member 300, the insulating member 322 and the cover member body portion 310 may be made of different materials.

In this embodiment, the metal member 321 includes fixed portions 321a which are fixed to the container 210 of the energy storage device 200, and reinforcing portions 321b which reinforce the insulating member 322. The insulating member 322 includes a portion to be reinforced 322a which is reinforced by the reinforcing portions 321b, and a rectangular-shaped opening portion 322b in which a portion of the bolt portion 410 of the external terminal 400 is housed. The bolt portion 410 includes a shaft-shaped threaded portion 411 on which threads are formed, and a rectangular planar plate-like head portion 412 which is continuously formed with the threaded portion 411.

To be more specific, the fixed portion 321a of the metal member 321 is a flat-plate-like portion which is disposed on the lid portion of the container 210 of the energy storage device 200 and around the electrode terminal (positive electrode terminal 220), and is fixed (joined) to the lid portion by welding such as laser welding, resistance welding or ultrasonic welding, for example. The reinforcing portions 321b of the metal member 321 are plate-like portions which are raised from the fixed portions 321a respectively and are inserted (embedded) into the portion to be reinforced 322a of the insulating member 322 thus enhancing rigidity of the portion to be reinforced 322a. To be more specific, the reinforcing portions 321b are disposed around the head portion 412 of the bolt portion 410 in the portion to be reinforced 322a. Particularly, the reinforcing portions 321b disposed on both sides of the head portion 412 in the X axis direction respectively have distal end portions thereof bent toward the head portion 412 thus further enhancing rigidity of the portion to be reinforced 322a.

The portion to be reinforced 322a of the insulating member 322 is an annular portion surrounding the head portion 412 of the bolt portion 410, and the reinforcing portions 321b are embedded in the portion to be reinforced 322a as described above and hence, rigidity of the portion to be reinforced 322a is enhanced. To be more specific, the head portion 412 includes a rectangular flat-plate-like head portion body 412a, and a head portion projecting portion 412b which projects outward from the periphery of an end portion of the head portion body 412a on a minus side in the Z axis direction. The head portion 412 is accommodated in the opening portion 322b of the insulating member 322 and hence, the bolt portion 410 is fixed to the insulating member 322. The opening portion 322b has a stepped shape (stepped portion) corresponding to the head portion projecting portion 412b and hence, the removal of the bolt portion 410 from the insulating member 322 toward a plus side in the Z axis direction can be suppressed by the head portion projecting portion 412b. As described above, the restricting portion 320 has the opening portion 322b which accommodates at least a portion of the head portion 412.

With such a configuration, the insulating member 322 is brought into contact with the external terminal 400 thus restricting the movement of the external terminal 400 caused by the rotation and the like of the external terminal 400. The opening portion 322b is brought into contact with the head portion 412 thus restricting the rotation of the external terminal 400 about an axis of the threaded portion 411. To be more specific, the metal member 321 is fixed to the container 210 of the energy storage device 200, and the insulating member 322 is brought into contact with the head portion 412 about the axis of the threaded portion 411 in the opening portion 322b thus restricting the rotation of the external terminal 400. As described above, the restricting portion 320 is brought into contact with the container 210 and the external terminal 400 thus restricting the rotation of the external terminal 400 with respect to the container 210. The restricting portion 320 is brought into contact with the container 210 which the one energy storage device 200 (the above-mentioned predetermined energy storage device 200) out of the plurality of energy storage devices 200 includes and the external terminal 400 thus restricting the movement of the external terminal 400 caused by an external force. As described above, the restricting portion 320 is disposed only to the energy storage device 200 having the electrode terminal to which the external terminal 400 is connected out of the plurality of energy storage devices 200.

In this embodiment, the insulating member 322 and the cover member body portion 310 form a continuously-formed integral molded product. By allowing a resin to flow into a die which is an integral body formed of a die for forming the insulating member 322 and a die for forming the cover member body portion 310, the cover member 300 which is an integral body formed of the insulating member 322 and the cover member body portion 310 is manufactured. In this manner, at least a portion of the restricting portion 320 is integrally formed with the cover member body portion 310 of the cover member 300.

The insulating member 322 has higher rigidity than the cover member body portion 310. To be more specific, the insulating member 322 is formed with a larger thickness (a thickness in the Z axis direction) than the cover member body portion 310. In this embodiment, a maximum value of the thickness of the insulating member 322 is set larger than a maximum value of the thickness of the cover member body portion 310. A minimum value of the thickness of the insulating member 322 may be set larger than the maximum value of the thickness of the cover member body portion 310, or an average value of the thickness of the insulating member 322 may be set larger than an average value of the thickness of the cover member body portion 310. The metal member 321 is disposed in the insulating member 322 and hence, the insulating member 322 (that is, the restricting portion 320) in which the metal member 321 is incorporated has higher rigidity than the cover member body portion 310. The insulating member 322 may be made of a material having higher rigidity than the cover member body portion 310.

At least one of the metal member 321 and the external terminal 400 is integrally formed with the insulating member 322. In this embodiment, both the metal member 321 and the bolt portion 410 of the external terminal 400 are integrally formed with the insulating member 322. The insulating member 322 is formed integrally with the metal member 321 and the bolt portion 410 by insert molding, for example. To be more specific, a resin is poured into a die where the metal member 321 and the bolt portion 410 are disposed so that an integrally molded product formed of the metal member 321, the bolt portion 410, and the insulating member 322 is formed. As described above, the insulating member 322 is a resin member made of a resin which can be formed by insert molding.

As shown in FIG. 3 and FIG. 5, the external terminal body portion 420 of the external terminal 400 includes a cover member connecting portion 421, an electrode terminal connecting portion 422, and an external terminal projecting portion 423.

The cover member connecting portion 421 is a rectangular flat-plate-like portion which is connected to the external conductive member 600 as shown in FIG. 5, and is placed on the restricting portion 320 of the cover member 300. To be more specific, the cover member connecting portion 421 has an upper surface 421a which is brought into surface contact with the conductive member 600, and a lower surface 421b which is brought into surface contact with an upper surface of the head portion body portion 412a of the bolt portion 410, and a circular-shaped opening portion 421c is formed in a center portion of the cover member connecting portion 421. The threaded portion 411 of the bolt portion 410 is inserted into the opening portion 421c and hence, the external terminal body portion 420 is positioned with respect to the bolt portion 410 and the restricting portion 320. The threaded portion 411 of the bolt portion 410 is also inserted into the conductive member 600 and is fastened with a nut (not shown in the drawing) and hence, the conductive member 600 is fixed to the external terminal 400.

The electrode terminal connecting portion 422 is a rectangular flat-plate-like portion which is connected to the electrode terminal (positive electrode terminal 220) of the energy storage device 200, and is disposed at a position one stage below the cover member connecting portion 421. To be more specific, the electrode terminal connecting portion 422 has an upper surface 422a and a lower surface 422b which is brought into surface contact with the positive electrode terminal 220. The electrode terminal connecting portion 422 is placed on an upper surface of the positive electrode terminal 220, and is fixed to the positive electrode terminal 220 by welding or the like.

As described above, the external terminal 400 includes the lower surface 422b as a first surface which is brought into surface contact with the electrode terminal (positive electrode terminal 220) which the one energy storage device 200 out of the plurality of energy storage devices 200 includes, and the upper surface 421a as a second surface which is brought into surface contact with the external conductive member 600 and hence, the electrode terminal and the conductive member 600 are electrically connected to each other. In this embodiment, a lower surface (lower surface of the head portion 412) of the bolt portion 410 is exposed from the opening portion 322b of the insulating member 322 and hence, the lower surface of the bolt portion 410 is also brought into contact (made conductive) with the upper surface of the positive electrode terminal 220. Here, the lower surface of the bolt portion 410 may not be brought into surface contact (made conductive) with the upper surface of the positive electrode terminal 220 and hence, for preventing removal of the bolt portion 410 from a lower side, the opening portion 322b of the insulating member 322 may be formed into a recessed shape so as to cover the lower surface of the bolt portion 410.

The external terminal projecting portion 423 is a rectangular flat-plate-like portion which projects toward a plus side in the Y axis direction from the electrode terminal connecting portion 422, and is disposed at a position one stage above the electrode terminal connecting portion 422. The external terminal projecting portion 423 is a portion for measuring a voltage or the like of the external terminal 400, and a voltage or the like of the external terminal 400 is measured by connecting a cable to the external terminal projecting portion 423.

As described above, the energy storage apparatus 10 according to this embodiment includes the restricting portions 320 each of which is brought into contact with the container 210 of the energy storage device 200 and the external terminal 400 (connecting member) thus restricting movement of the external terminal 400 caused by an external force. In the configuration where the external terminal 400 is directly connected to the electrode terminal of the energy storage device 200, when the external terminal 400 intends to move (rotate, for example) by an external force, a force that the external terminal 400 intends to move (a rotational torque, for example) is directly applied to the electrode terminal and hence, an excessively large force is applied to the electrode terminal thus giving rise to a possibility that the electrode terminal is damaged. The restricting portion 320 is brought into contact with the container 210 thus restricting the movement (the rotation, for example) of the external terminal 400 and hence, a force that the external terminal 400 intends to move (a rotational torque, for example) can be applied to the container 210 so that it is possible to suppress the occurrence of damage on the electrode terminal of the energy storage device 200.

The opening portion 322b formed on the restricting portion 320 is brought into contact with the head portion 412 of the bolt portion 410 of the external terminal 400 thus restricting the rotation of the external terminal 400 about the axis of the threaded portion 411 of the bolt portion 410. In the case where the external terminal 400 includes the bolt portion 410, fastening of the bolt is performed at the time of connecting the external conductive member 600 to the external terminal 400. At this stage, the external terminal 400 intends to rotate about the axis of the threaded portion 411 of the bolt portion 410. Accordingly, by bringing the head portion 412 of the bolt portion 410 into contact with the opening portion 322b of the restricting portion 320, the rotation of the external terminal 400 can be restricted. The movement of the external terminal 400 caused by an external force can be restricted as described above and hence, it is possible to suppress the occurrence of damage on the electrode terminal of the energy storage device 200.

The external terminal body portion 420 which makes the electrode terminal of the energy storage device 200 and the external conductive member 600 conductive to each other is formed separately from the bolt portion 410 and hence, in the fastening of the bolt at the time of connecting the conductive member 600 to the external terminal 400, it is possible to suppress the applying torque to the external terminal body portion 420 at the time of fastening the bolt.

The restricting portion 320 includes: the metal member 321 which is fixed to the container 210 of the energy storage device 200; and the insulating member 322 which is brought into contact with the external terminal 400 between the metal member 321 and the external terminal 400 thus restricting the movement of the external terminal 400. Also when the restricting portion 320 is fixed to the container 210 by the metal member 321, the movement of the external terminal 400 can be restricted while ensuring the insulation between the container 210, the metal member 321 and the external terminal 400 by the insulating member 322.

By reinforcing the insulating member 322 using the metal member 321 and by forming the insulating member 322 with a large thickness, rigidity of the restricting portion 320 is increased so that the movement of the external terminal 400 can be strictly restricted.

At least a portion (insulating member 322) of the restricting portion 320 is continuously and integrally formed with the cover member body portion 310 disposed in a straddling manner over the plurality of energy storage devices 200 and hence, the number of parts can be reduced whereby the manufacture of the energy storage apparatus can be simplified.

The metal member 321 and the external terminal 400 are integrally formed (integral forming) with the insulating member 322 by insert molding or the like and hence, the number of parts can be reduced and hence, the manufacture of the energy storage apparatus can be simplified.

By forming the electrode terminals of the energy storage device 200 using the welded terminals, the electrode terminals other than the electrode terminal connected to the external terminal 400 and the bus bars 500 can be connected to each other by welding and hence, the number of parts can be reduced, and the electrode terminals and the bus bars 500 can be firmly fixed to each other. When the electrode terminal connected to the external terminal 400 is also the welded terminal and a bolt is directly mounted on the welded terminal, it is unexpected that the bolt is mounted on the welded terminal and hence, the welded terminal is weak against a torque at the time of fastening the bolt thus giving rise to a possibility that the welded terminal is damaged. In view of the above, by applying a force that the external terminal 400 intends to move (that is, a rotational torque) to the container 210 of the energy storage device 200, it is possible to suppress the occurrence of damage on the welded terminal.

With the above-mentioned configuration, in the energy storage apparatus 10, the electrode terminals of the energy storage devices 200 are firmly connected to each other by welding, and in the energy storage apparatus 10, the external terminal 400 and the external conductive member 600 can be connected to each other using a bolt in a detachable manner.

Modification 1

Figure 6:
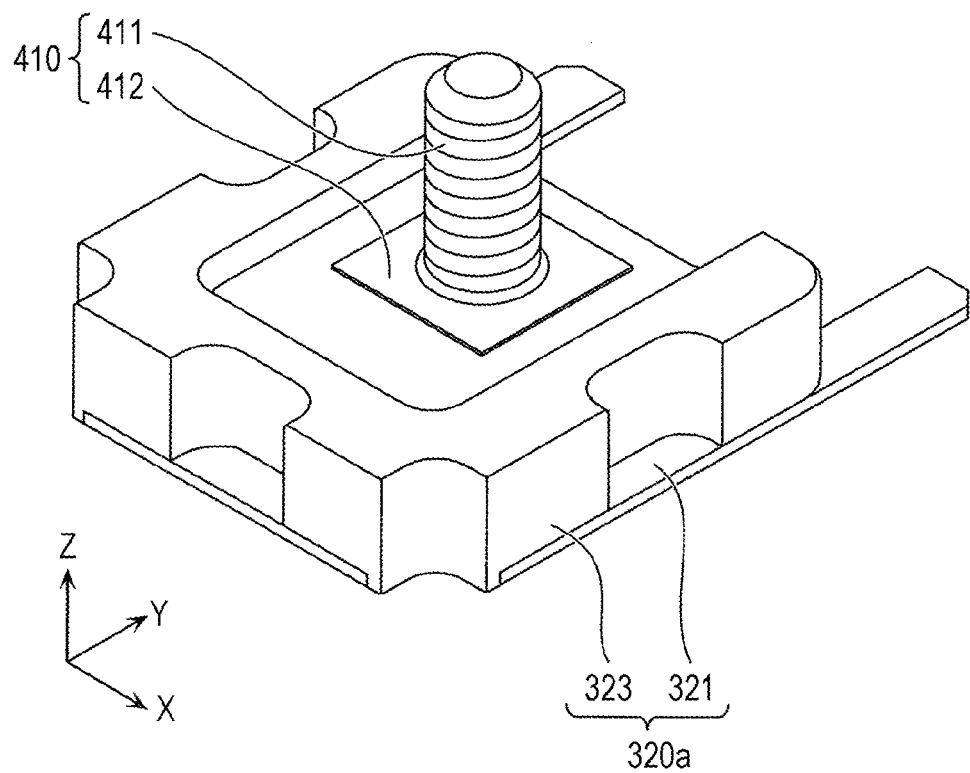
FIG. 6 is a perspective view showing a configuration of a restricting portion according to a modification 1 of the embodiment.

Next, a modification 1 of the above-mentioned embodiment is described. FIG. 6 is a perspective view showing a configuration of a restricting portion 320a according to the modification 1 of the above-mentioned embodiment.

In the above-mentioned embodiment, the insulating member 322 of the restricting portion 320 is continuously and integrally formed with the cover member body portion 310. As shown in the drawing, in this modification, the restricting portion 320a includes an insulating member 323 which is formed separately from the cover member body portion 310. Other configurations are substantially equal to the corresponding configurations of the above-mentioned embodiment and hence, the description of such configurations is omitted.

As described above, the energy storage apparatus 10 according to the modification 1 of the above-mentioned embodiment can acquire substantially the same advantageous effects as the above-mentioned embodiment. Particularly, in this modification, the insulating member 323 is formed separately from the cover member body portion 310 and hence, in forming the insulating member 323 by insert molding, a small die can be used whereby the insert molding can be performed easily.

Modification 2

Figure 7A:
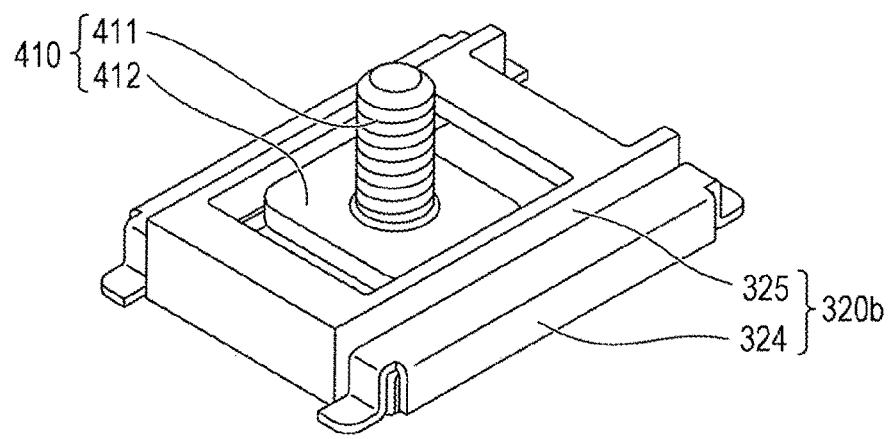
FIG. 7A and FIG. 7B are perspective views showing a configuration of a restricting portion according to a modification 2 of the embodiment.
Figure 7B:
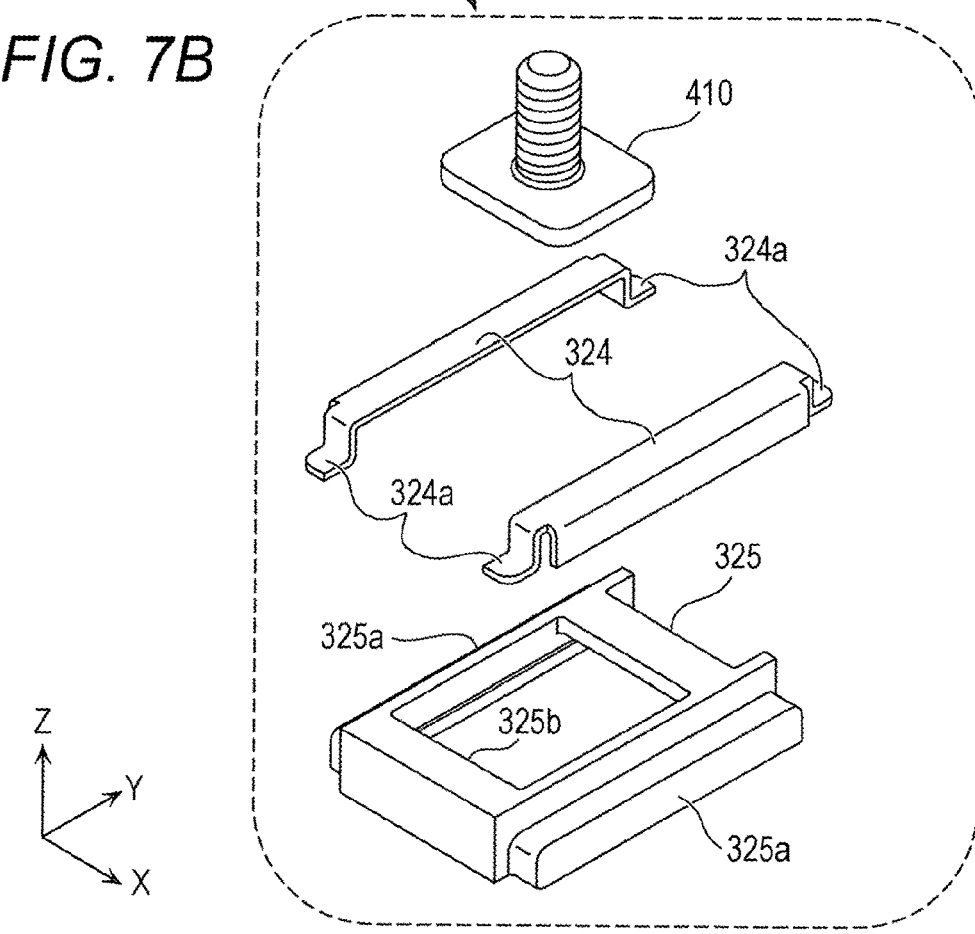

Next, a modification 2 of the above-mentioned embodiment is described. FIG. 7A and FIG. 7A are perspective views showing a configuration of a restricting portion 320b according to the modification 2 of the above-mentioned embodiment. To be more specific, FIG. 7A is a perspective view showing a state where the bolt portion 410 and the metal member 324 and the insulating member 325 of the restricting portion 320b are assembled to each other, and FIG. 7B is a perspective view showing a state where the bolt portion 410, the metal member 324, and the insulating member 325 are separated from each other.

In the above-mentioned embodiment and the modification 1 of the above-mentioned embodiment, the bolt portion 410, the metal member 321 and the insulating member 322 are formed as an integral body by insert molding. As shown in FIG. 7A and FIG. 7B, in this modification, the restricting portion 320b includes a metal member 324 and an insulating member 325 which are formed separately from the bolt portion 410.

To be more specific, the metal member 324 is formed of two plate-like members extending in the Y axis direction, and end portions 324a on both sides in the Y axis direction of each plate-like member are fixed to the container 210 of the energy storage device 200 by welding or the like. The insulating member 325 includes a projecting portion 325a projecting in the X axis direction, and is fixed to the container 210 in a state where the projecting portion 325a is pressed by the metal member 324 from above. The head portion 412 of the bolt portion 410 is accommodated in the opening portion 325b of the insulating member 325. Other configurations are substantially equal to the corresponding configurations of the above-mentioned embodiment and the corresponding configurations of the modification of the above-mentioned embodiment and hence, the description of such configurations is omitted.

As described above, the energy storage apparatus 10 according to the modification 2 of the above-mentioned embodiment can acquire substantially the same advantageous effects as the above-mentioned embodiment and the modifications of the above-mentioned embodiment. Particularly, in this modification, the bolt portion 410, the metal member 321 and the insulating member 322 are disposed easily without performing insert molding.

Modification 3

Figure 8A:
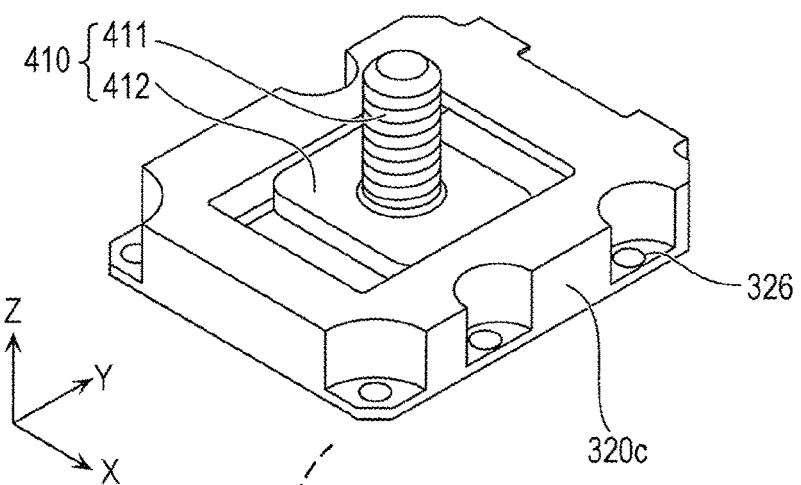
FIG. 8A and FIG. 8B are perspective views showing a configuration of a restricting portion according to a modification 3 of the embodiment.

Next, a modification 3 of the above-mentioned embodiment is described. FIG. 8A and FIG. 8A are perspective views showing a configuration of a restricting portion 320c according to the modification 3 of the above-mentioned embodiment. To be more specific, FIG. 8A is a perspective view showing a state where the bolt portion 410 and the restricting portion 320c are assembled to each other, and FIG. 7B is a perspective view showing a state where the bolt portion 410 and restricting portion 320c are mounted on the container 210 and the positive electrode terminal 220 of the energy storage device 200 together with the external terminal body portion 420.

Figure 8B:
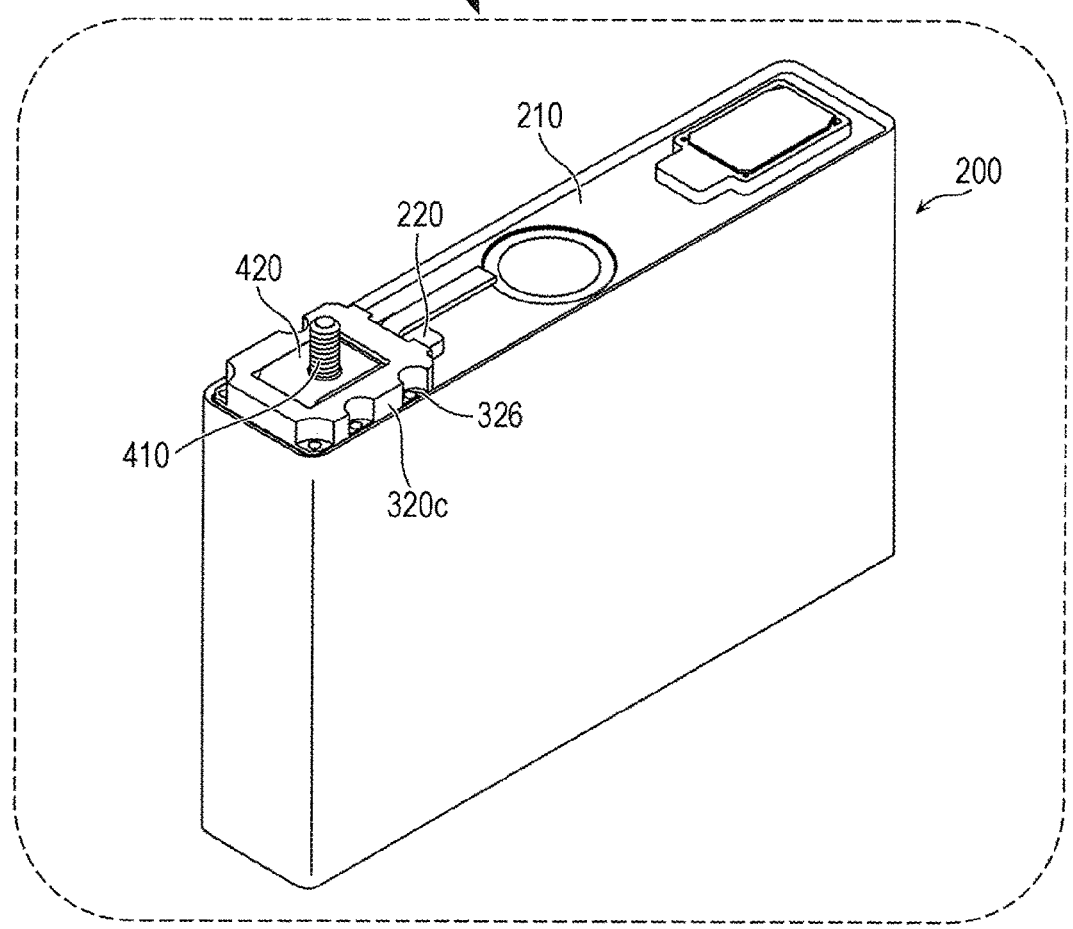

In the above-mentioned embodiment and the modifications 1, 2 of the above-mentioned embodiment, the restricting portion includes the metal member and the insulating member. As shown in FIG. 8A and FIG. 8B, in this modification, the restricting portion 320c does not include a metal member and is formed of an insulating member. To be more specific, the restricting portion 320c is fixed to the container 210 by disposing a stainless ball in a through hole 326 having a circular shape and by welding the stainless ball to the container 210 of the energy storage device 200. Other configurations are substantially equal to the corresponding configurations of the above-mentioned embodiment and the corresponding configurations of the modifications of the above-mentioned embodiment and hence, the description of such configurations is omitted.

As described above, the energy storage apparatus 10 according to the modification 3 of the above-mentioned embodiment can acquire substantially the same advantageous effects as the above-mentioned embodiment and the modifications of the above-mentioned embodiment. Particularly, in this modification, the restricting portion 320c does not include a metal member and hence, the restricting portion 320c can be configured in a simplified manner.

Although the energy storage apparatus 10 according to the embodiment of the present invention and the modifications of the embodiment has been described heretofore, the present invention is not limited to the above-mentioned embodiment and the modifications of the embodiment. It should be construed that the embodiment and the modifications of the embodiment disclosed in this specification are only for an exemplifying purpose in all aspects and is not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and the modifications of the embodiment, as a connecting member which is connected to the electrode terminal of the energy storage device 200 and is also connected to the external conductive member 600, the external terminal 400 is exemplified. The connecting member is not limited to the above-exemplified external terminal 400 provided that the connecting member is connected to the electrode terminal and the conductive member 600, and the connecting member may have any shape and size.

In the above-mentioned embodiment and the modifications of the embodiment, the case where the restricting portion (insulating member) mainly restricts the rotation of the external terminal 400 has been exemplified as the example where the restricting portion (insulating member) restricts the movement of the external terminal 400 caused by an external force. The restriction made by the restricting portion (insulating member) is not limited to the restriction of the rotation of the external terminal 400. For example, the restricting portion (insulating member) may restrict the movement of the external terminal 400 in any directions including the linear movement of the external terminal 400.

In the above-mentioned embodiment and the modifications of the embodiment, the restricting portion is fixed to the lid portion of the container 210 of the energy storage device 200. The restricting portion may be fixed to a portion (a side surface portion, a bottom surface portion or the like) other than the lid portion of the container 210. The restricting portion is not limited to be fixed to the container 210 provided that the restricting portion can restrict the movement of the external terminal 400, and may be configured such that the restricting portion is merely brought into contact with, engaged with or fitted to the container 210. For example, the restricting portion may be configured such that the restricting portion sandwiches both side surface portions of the container 210 and is brought into contact with both side surface portions thus restricting the movement of the external terminal 400.

In the above-mentioned embodiment and the modification 1 of the embodiment, the metal member 321 and the bolt portion 410 are integrally formed with the insulating member by insert molding. A configuration where one of the metal member 321 and the bolt portion 410 is integrally formed with the insulating member by insert molding and the other is not integrally formed with the insulating member by insert molding may be adopted. Alternately, the external terminal body portion 420 is also formed integrally with the insulating member by insert molding. A method of integral forming is not limited to the insert molding, and a conventional method can be suitably adopted.

In the above-mentioned embodiment and the modifications 1, 2 of the embodiment, the restricting portion includes the metal member and the insulating member. The restricting portion may include a member made of a material other than metal such as a resin having higher rigidity than the insulating member in place of the metal member.

In the above-mentioned embodiment and the modifications of the embodiment, the restricting portion includes the insulating member, and the insulation between the external terminal 400 and the container 210 is ensured by the insulating member. In a case where it is unnecessary to ensure the insulation between the external terminal 400 and the container 210 such as a case where the external terminal 400 and the container 210 are insulated from each other by other gasket or the like or a case where the potential of the container 210 is dropped to a positive electrode potential, the restricting portion may be formed of a conductive member such as a metal member in place of the insulating member.

In the above-mentioned embodiment and the modifications of the embodiment, the bolt portion 410 and the external terminal body portion 420 are formed separately from each other. The bolt portion 410 and the external terminal body portion 420 may be integrally formed as one member.

In the above-mentioned embodiment and the modifications of the embodiment, the electrode terminals of all energy storage devices 200 are welded terminals. Some electrode terminals may be bolt terminals.

In the above-mentioned embodiment, the insulating member 322 of the restricting portion 320 is continuously and integrally formed with the cover member body portion 310. The insulating member 322 may be formed integrally with a member other than the cover member body portion 310 such as the outer case 100 or the lid body of the outer case 100.

In the above-mentioned embodiment and the modifications of the embodiment, the restricting portion has the higher rigidity than the cover member body portion 310. The restricting portion may have the lower rigidity than the outer cover body portion 310 provided that the restricting portion has a rigidity capable of restricting the movement of the external terminal 400.

The configurations which are made by arbitrarily combining the respective constitutional elements which the above-mentioned embodiment and the modifications of the embodiment include are also included in the scope of the present invention. For example, the insulating member 325 of the restricting portion 320b according to the modification 2 or the restricting portion 320c according to the modification 3 may be integrally formed with the cover member body portion 310, or the restricting portion 320c according to the modification 3 may be integrally formed with the bolt portion 410 by insert molding.

The present invention can be realized not only as the above-mentioned energy storage apparatus but also as the restricting portion which the energy storage apparatus 10 includes.

The present invention is applicable to an energy storage apparatus including energy storage devices such as a lithium ion secondary battery.

What is claimed is:

1. An energy storage apparatus, comprising:
   energy storage devices each of which includes a container and a first electrode terminal and a second electrode terminal;
   an external terminal which is connected to the first electrode terminal of one of the energy storage devices and is connectable to an external conductive member;
   a bus bar connected by welding to the second electrode terminal of the one of the energy storage devices and to an electrode terminal of another one of the energy storage devices disposed adjacently to the one of the energy storage devices; and
   a restricting portion which is in contact with the container of the one of the energy storage devices, and is in contact with the external terminal to restrict the external terminal from moving by an external force.

2. The energy storage apparatus according to claim 1, wherein the external terminal includes a bolt portion including a threaded portion and a head portion,
   wherein the restricting portion includes an opening portion which accommodates at least a part of the head portion, and
   wherein the opening portion is in contact with the head portion to restrict the external terminal from rotating about an axis of the threaded portion.

3. The energy storage apparatus according to claim 2, wherein the eternal terminal further includes a body portion having a first surface which is in surface contact with the electrode terminal of the one of the energy storage devices, and a second surface which is in surface contact with the conductive member, and
   wherein the body portion is formed separately from the bolt portion.

4. The energy storage apparatus according to claim 1, wherein the restricting portion includes:
   a metal member fixed to the container of the one of the energy storage device; and
   an insulating member which is disposed between the metal member and the external terminal and is in contact with the external terminal to restrict the external terminal from moving.

5. The energy storage apparatus according to claim 4, wherein at least one of the metal member and the external terminal is integrally formed with the insulating member.

6. The energy storage apparatus according to claim 1, wherein the electrode terminals of the energy storage devices include welded terminals which are weldable with the bus bar.

7. The energy storage apparatus according to claim 1, further comprising:
   an cover member which is disposed in a straddling manner over the energy storage devices,
   wherein at least a part of the restricting portion is integrally formed with the cover member.

8. The energy storage apparatus according to claim 7, wherein the restricting portion has higher rigidity than the cover member.

9. The energy storage apparatus according to claim 1, wherein the restricting portion includes an insulating member which is in a direct contact with the container.

10. The energy storage apparatus according to claim 9, wherein the insulating member is in a direct contact with the external terminal.

11. The energy storage apparatus according to claim 10, wherein the restricting portion further includes a metal member disposed on a surface of the insulating member.

12. The energy storage apparatus according to claim 11, wherein the metal member is in a direct contact with the container.

13. The energy storage apparatus according to claim 1, further comprising:
    a cover member disposed above the energy storage devices,
    wherein the bus bar is disposed above the cover member.

14. The energy storage apparatus according to claim 13, wherein the cover member comprises an opening for positioning the bus bar on the cover member.

15. An energy storage apparatus, comprising:
    energy storage devices each of which includes a container and a first electrode terminal and a second electrode terminal;
    an external terminal which is connected to the first electrode terminal of one of the energy storage devices;
    a bus bar connected to the second electrode terminal of the one of the energy storage devices and to an electrode terminal of another one of the energy storage devices disposed adjacently to the one of the energy storage devices; and
    a restricting portion which is in contact with the container and the external terminal to restrict the external terminal from moving.

16. The energy storage apparatus according to claim 15, wherein the restricting portion includes an insulating member which is in a direct contact with the container.

17. The energy storage apparatus according to claim 16, wherein the insulating member is in a direct contact with the external terminal.

18. The energy storage apparatus according to claim 17, wherein the restricting portion further includes a metal member disposed on a surface of the insulating member.

19. The energy storage apparatus according to claim 18, wherein the metal member is in a direct contact with the container.

20. The energy storage apparatus according to claim 15, further comprising:
    a cover member disposed above the energy storage devices,
    wherein the bus bar is disposed above the cover member, and
    wherein the cover member comprises an opening for positioning the bus bar on the cover member.

* * * * *